United States Patent

[11] 3,591,763

[72] Inventor Milton Hinden
 15 Bay Link, Massapequa, N.Y. 11758
[21] Appl. No. 49,253
[22] Filed June 24, 1970
[45] Patented July 6, 1971

[54] METHOD AND APPLICATOR PIN FOR ATTACHING INSULATOR MATERIAL TO DUCTS BY RESISTANCE WELDING
 5 Claims, 7 Drawing Figs.
[52] U.S. Cl. .................................................. 219/99,
 29/464
[51] Int. Cl. ................................................ B23k 9/20
[50] Field of Search .......................................... 219/98, 99;
 228/4; 29/464, 493; 85/16

[56] References Cited
UNITED STATES PATENTS
477,587 1892 Albrecht ..................... 85/16
1,241,290 9/1917 Senftner ..................... 85/16

Primary Examiner—J. V. Truhe
Assistant Examiner—Robert E. O'Neill
Attorneys—Mark T. Basseches and Paula T. Basseches ABSTRACT: A welding pin and method of attaching the same for securing insulator material to ducts. The pin is characterized by an enlarged head portion, a shank extending at right angles to the head portion, terminating in a sharpened tip. The length of the shank is less than the radius of the head portion so that when the pin is supported on a horizontal surface, such as a layer of insulator material disposed above a duct, the included angle between the insulator material and the plane of the head portion is less than 45°.

PATENTED JUL 6 1971

3,591,763

INVENTOR.
MILTON HINDEN
BY Mark Sanecker
ATTORNEY

METHOD AND APPLICATOR PIN FOR ATTACHING INSULATOR MATERIAL TO DUCTS BY RESISTANCE WELDING

The method of attaching the pin includes the steps of advancing a planar welding electrode toward the insulation in a perpendicular path, the electrode functioning, with progressive movement, to tilt the pin and finally, after the tip of the pin is engaged against the duct or substrate, to force the head of the pin into a parallel relation to the under surface of the welding electrode.

Preferably, the flow of welding current is initiated responsive to sensing of a predetermined selected pressure of the welding electrode against the head of the pin.

The present invention relates to the method of attaching insulator material, such as fiberglass batts or the like, to a duct or large sheet metal section which is subsequently formed into a duct by bending in a brake, etc.

In heating and air conditioning systems, the current practice involves the application of batts or slabs of insulating material to a duct or to metal to be formed into a duct. Insulated ducts are, of course, more efficient in that heat exchange, due to exposure of the duct to ambient conditions, is minimized.

In my aforementioned copending application, there is described a method for securing insulating material to ducts or sheet metal components by resistance welding to assure a secure connection, without damaging the insulating material. The sheet metal to which the insulation is to be applied may be elongated and of considerable width, in the area of 4 to 6 feet or more.

In a copending application filed on even date herewith, and entitled WELDING APPARATUS, there is described a welding device which may be advantageously employed in affixing a pin to the duct by a welding step. Briefly, the welding apparatus is shiftable linearly along a path above and transverse to an elongated piece of sheet metal of substantial width.

It is necessary, in devices heretofore used, to position the welding pins relative to the insulating material either manually by some form of jig, or by disposing the same in a chuck on the welding apparatus. Application of the pins to the jig or to the chuck is a time-consuming operation, interfering with mass production techniques. Further, it is evident that the pins, after welding, must be removed from the jig or chuck, involving still further time wastage.

In an alternate manner of application, it is possible in some instances, i.e. in the use of narrow metal strips, for the worker manually to force the welding pins into position across the width of the strip by physically inserting the points through the insulating material. However, this manner of application is impractical where considerable widths of sheet metal are involved, since it is obvious that a single worker will not be able to lean across or otherwise reach the remote side of the metal strip.

The present invention is directed to a welding pin member having a particular geometric configuration which enables the pin, when used in conjunction with a yieldable insulative material such as a fiberglass batt, to be automatically tilted and aligned in precise perpendicular relation to the sheet metal. The pin in accordance with the invention may be laid haphazardly atop the insulator so that the weight of the pin is supported in part by the tip and in part by an edge portion of the head engaging the insulative layer. When the planar welding electrode is brought down against the uppermost portion of the head, the pin is automatically tilted and advanced toward the duct, ultimately to assume the desired perpendicular orientation.

In accordance with an additional embodiment of the method, the welding current flow is initiated responsive to the sensing of a back pressure against the welding electrode developed through the pin. The pressure required to initiate a welding cycle is greater than the pressure required to bend the head relative to the shank of the pin. Thus, if by some mischance a pin fails to be aligned and the welding head is nonetheless brought down against the pin, it will be impossible to develop the pressure necessary to initiate a flow of welding current and there will, thus, be no likelihood that the pin will be misattached.

SUMMARY OF THE INVENTION

A welding pin for attachment by resistance welding through a batt of readily compressible insulative material to a duct or sheet metal surface disposed beneath the material.

The pin is characterized by a shank portion terminating in a sharpened tip at one end, the other end of the shank being affixed to or integral with an enlarged head. The length of the shank from the head to the tip is less than the radius of the head, whereby when the pin is disposed atop an insulative layer, with the tip and edge portion of the head engaging the layer, the included angle between the surface of the layer and the head will be less than 45°.

Since the pin is used with a readily compressed insulating layer, it will be obvious that, due to the diminished surface area of the sharpened tip as contrasted with the area of the edge of the head, pressure applied by a welding electrode will cause the pin to pivot about the engaging portion of the head as a fulcrum rather than the tip, due to the lesser resistance of the tip to penetration and to the angle of the head relative to the insulator layer.

The method includes the steps of disposing the pin on the upper surface of an insulating layer and advancing an electrode in a perpendicular path with respect to the sheet metal, the under face of the electrode being parallel to the sheet metal. The electrode continues to be advanced, causing the pivotal movement of the pin aforesaid, inducing the head to become progressively aligned with the plane of the electrode and advancing the tip of the pin into contact with the sheet metal. Continued pressure induces a flow of welding current, causing the formation of a weld.

The welding current cannot flow where a pin, by some mischance, maintains an inclined relationship relative to the sheet metal since, in such circumstances, the head of the pin will bend relative to the shank before the pressure required to initiate the welding circuit can be developed.

It is accordingly an object of the invention to provide an improved welding pin for the attachment by resistance welding of an insulative layer of material to sheet metal or to a duct.

A further object of the invention is the provision of a welding pin of the type described of a geometry in which the pin will automatically align itself in the desired perpendicular orientation of the shank relative to the sheet metal responsive to continued movement of the welding electrode.

A further object of the invention is to provide a method for applying welding pins to a sheet metal or like substrate wherein it is unnecessary manually to orient the pin relative to the duct or sheet metal.

To attain these objects and such further objects as may appear herein or be hereinafter pointed out, reference is made to the accompanying drawings, forming a part hereof, in which.

Figure 2:
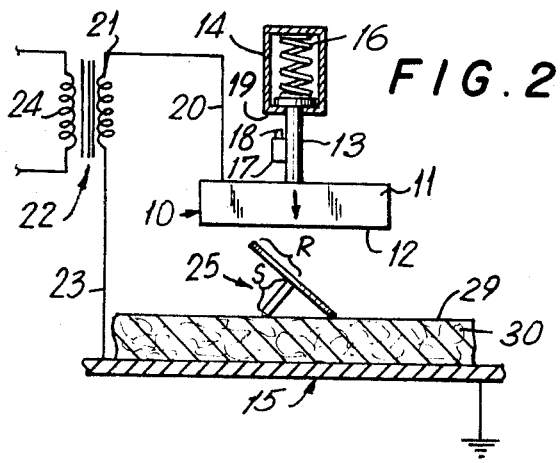
FIGS. 2 to 5 are sequential views showing the series of steps of attachment of the pin to a sheet metal substrate through an insulative body, the welding apparatus being diagrammatically illustrated.

Referring now to FIG. 2, there is diagrammatically shown a welding apparatus 10 including an electrode 11 having a flat under surface 12. As illustrated thereon, the electrode 11 includes an upwardly directed guide column 13 slidably extending into the housing 14 connected to a drive mechanism (not shown) which is capable of forcing the housing 14 in a vertical direction toward the sheet metal substrate 15. A suitable welding assembly for attaching the welding pin and performing the welding method of the present application is disclosed in detail in my application filed on even date herewith, entitled WELDING APPARATUS.

The electrode 11 is normally biased downwardly in the housing by a spring member 16, it being understood that the slide connection between the guide column 13 and the housing 14 is effected through the intermediary of an insulator or insulators so that the electrode is not in conductive relationship with the housing. Thus, the electrode is provided with a lost motion coupling to the housing 14 which is attached to the drive mechanism.

A switch 17 is mounted to the column, the switch including a contact operator plunger 18 which is upwardly directed toward an under surface 19 of the housing 14. It will be appreciated that when sufficient pressure is developed against the under surface 12 of the electrode, the column 13 will move upwardly relative to the housing against the pressure of spring 16, causing the switch 17 to be closed by the engagement of the plunger 18 against the portion 19.

The electrode 11 is connected by lead 20 to the secondary 21 of a welding transformer 22, the other secondary or ground lead 23 being connected to the substrate 15, which is likewise grounded. The primary 24 of the transformer 22 is connected so as to be activated when the contacts of switch 17 are closed, either directly or preferably through the intermediary of a relay and timing mechanism for controlling the effective period of flow of welding current.

The showing of the welding apparatus proper is diagrammatic for purposes of simplicity, and no claim to such apparatus is made in this application.

Figure 1:
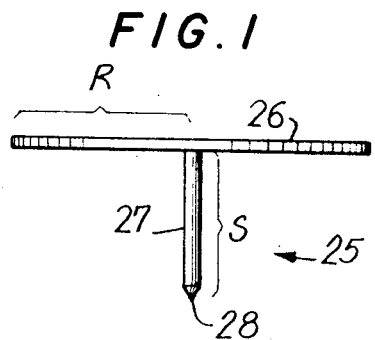
FIG. 1 is an enlarged view of a welding pin in accordance with the invention.

Referring now to FIG. 1, there is shown the welding pin 25 which provides a primary advance of the present application. The welding pin includes an enlarged head portion 26, a shank portion 27 extending perpendicularly thereto, and a sharpened tip portion 28 at the distal end of the shank. As noted in my copending application Ser. No. 797,603, it is imperative that the tip of the welding pin be extremely sharp, adequate sharpness being provided by lathe turning procedures. As noted in said application Ser. No. 797,603, conventional nail pointing devices have not been able to produce a point having the requisite sharpness and, thus, resort has been made to the more expensive lathe-turning techniques.

The size relationship of the head 26 of the welding pin relative to the shank 27 of the pin forms an important feature of the present invention.

I have discovered that for purposes of satisfactory operation, it is important that the length S of the shank 27 not exceed the radius R of the head 26 of the pin. The importance of this relationship is best appreciated by reference to FIG. 1a wherein the pin 25 is disposed atop a horizontal surface 29 representing, by way of example, the upper surface of a batt or slab of insulation material 30.

Figure 1A:
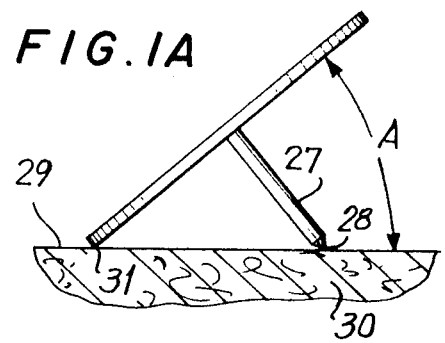
FIG. 1a is a view similar to FIG. 1 showing the welding pin of the present invention supported on its side on a flat surface.

As will be evident from FIG. 1a, the pin 25 is shown in essentially the position which is would occupy if it were haphazardly placed atop the surface 29 of the insulation material 30. As shown in said figure, the surface 29 lies tangent to the tip 28 and to a lowermost peripheral edge portion 31 of the head 26. In this position, the angle A included between the under surface of the head 26 and the upper surface 29 of the insulator material 30 is less than 45°. By providing a structure in which the noted angular relationship is achieved, the pin, when subjected to a vertical downward pressure applied by a flat under surface, such as the surface 12 of an electrode, will pivot within the insulating material about the peripheral edge portion 31 as a fulcrum, tending to shift the upper surface of the head 26 into alignment with the under surface 12 of the electrode.

The sequence of attachment steps wherein the head pivots into the desired relationship is illustrated best by following the sequence shown in FIGS. 2 through 5.

In FIG. 2, the housing 14 carrying the electrode 11 is shown shifting vertically downward toward the substrate 15.

Figure 3:
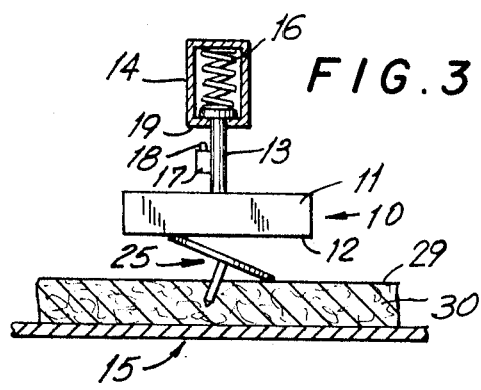

In FIG. 3 the welding pin has been partially pivoted within the batt or mass of insulating material. As will be readily understood, by reason of the soft nature of the fiberglass material typically used in ducts of this type, pressure of large magnitude need not be applied by the electrode to the pin since the tip of the pin readily penetrates the soft material of the insulation. The desired pivotal movement is effected both by reason of the angle at which the uppermost edge 32 of the head 26 engages the under surface 12 of the electrode (such angle also being less than 45°) and by reason of the further fact that, due to the greater area of the periphery of the head than the point or tip 28 of the pin, the head will be more resistant to penetration of the insulator than will the tip.

Figure 4:
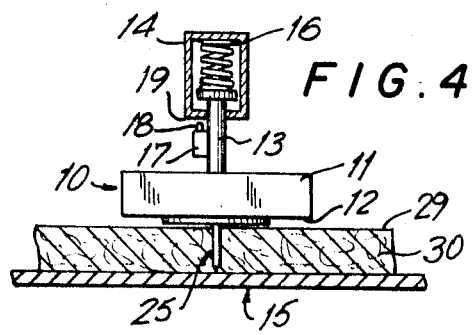

With continued downward pressure, the parts reach the position of FIG. 4 wherein it will be seen that the tip 28 is engaged against the upper surface of the substrate 15, preventing any further downward movement of the tip.

At this point in the sequence of operation, the shank may or may not be aligned in precise perpendicular relation to the substrate. However, by reason of the fact that the insulation prevents lateral shifting of the shank, continued downward pressure of the electrode will cause the head 26 of the pin to become precisely aligned with the under surface 12 of the electrode, thereby achieving the precise desired orientation of the pin.

To this point the pressures applied have not been sufficient to compress the spring 16 and thereby trigger the flow of welding current.

In FIG. 4 the pin has been shown to be in the precise desired alignment, whereupon further downward movement of the housing 14 may not longer be accompanied by a downward movement of the electrode 11 due to the aforesaid vertical disposition of the pin. When the pin is thus vertically oriented, continued downward movement of the housing 14 will result in a compression of spring 16 and resultant triggering of a welding current flow by reason of the activation of the switch 17.

As noted in my recited copending applications, the flow of welding current will result in fusing of the tip portion of the pin to the substrate 15, to afford a firm resistance welded connection of the pin.

It is an important feature of the invention that inadvertent misattachment of a pin to a duct cannot result from the practice of the method. The desirability of this feature will be appreciated from the fact that after bending of the material into a duct configuration, the insulator material, in many instances, forms the inside of the duct. In the event that a pin were attached angularly relative to the duct, it would be evident that a sharp portion of the head of the pin would project into the airstream of the duct, or into a pocket defined within the insulation material. In such instance there would be a strong likelihood that whistles or turbulence would occur within the duct.

Misattachment is avoided by the requirement that back pressure of a predetermined magnitude be sensed before the spring 16 may be compressed to a degree necessary to trigger the flow of welding current. If, due to some mischance, the included angle A is greater than 45°, the pin is so constructed and related to the force needed to trigger the flow of welding current that upon application of a downward pressure, the head of the pin will bend relative to the shank before a back pressure sufficient to trigger the flow of welding current is developed.

Figure 6:
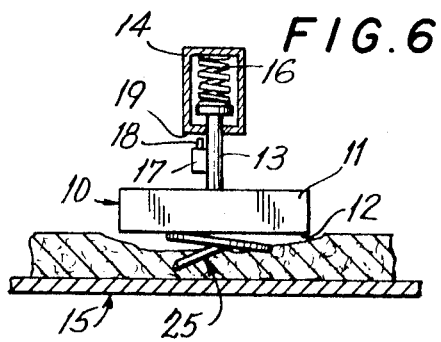
FIG. 6 is a view similar to FIGS. 2 to 5, showing the disposition of the parts where a misformed or misaligned pin is attempted to be welded.
Figure 5:
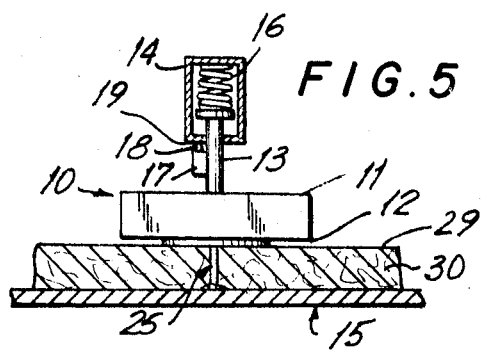

By way of example, if the lowermost portion 31 of the welding pin were to lie within a hollow or cup in the insulation, the angle A may exceed 45°. Under such circumstances, (and as depicted in FIG. 6), the desired turning moment wherein the point 28 is directed approximately downwardly toward the substrate, may not develop and the pin will be pressed sidewisely through the insulation. As shown in FIG. 6, the result of this sequence cannot be a misattachment of the welding pin since continued downward movement will merely result in a bending of the head and shank of the pin relative to each other, which bending occurs at a pressure less than the pressure required to trip the switch 17.

As will be appreciated from the foregoing, in order for the worker to attach a series of pins, he need merely manually or otherwise dispose the pins atop the insulation batt in a random arrangement, it being satisfactory if the pins are inclined relative to the insulator sheet. The worker thereupon brings the electrode down on top of the pins with the downward pressure serving initially to orient the pins in a desired perpendicular configuration relative to the sheet metal, and thereafter to cause the flow of a welding current.

Through the use of a pressure activated welding circuit in conjunction with a welding pin so formed that the requisite back pressure to initiate a welding circuit cannot be achieved unless the desired perpendicular relationship has already been effected, there is eliminated any possibility of misattachment of a pin to the duct.

From the foregoing it is evident that there is disclosed an improved welding pin and method of attaching the same whereby substantial economies may be achieved by way of reduced labor costs and reduced losses through misattachment of welding pins.

The configuration of the pins is such as to eliminate the necessity for individually inserting the pins in the chuck of a welding machine or in a jig calculated to orient the pins with respect to the attachment surface.

I claim:

1. The method of attaching, by resistance welding, a welding pin having an enlarged planar head portion and a shank extending perpendicular thereto and terminating in a sharpened tip, the length of said shank being less than the radius of said head, to a planar work surface which is covered by an insulative layer in such manner that the shank of the pin is perpendicular to the surface, which comprises the steps of supporting the pin on a compressible insulator layer which parallels the surface with an edge of the head portion and a side portion of the tip engaging the layer, advancing a welding electrode having a planar under surface parallel with said work surface toward said work surface in a direction perpendicular thereto, causing said under surface of said electrode to contact the uppermost part of said head portion, progressively advancing said electrode toward said surface to induce a tilting movement in said shank as a result of compression and imbedment of said pin in said layer, further advancing said electrode toward said surface to cause said tip to contact said surface and to cause said head to conform to the plane of the under surface of said electrode, and thereafter causing a welding current to flow through said electrode head and shank, thereby to weld said pin to said surface.

2. The method of claim 1 and including the additional step of automatically causing said welding current to flow responsive to the exertion of a predetermined pressure of said electrode against said pin.

3. The method of claim 2 wherein said predetermined pressure required to energize said welding circuit exceeds the pressure required to bend said welding pin and modify the angle between said head and shank whereby a welding current flow can only be initiated if said shank is perpendicular to said surface.

4. The method of attaching by resistance welding a welding pin having an enlarged planar head portion and a shank extending perpendicular thereto and terminating in a sharpened tip, said head and shank being relatively bendable when supported on a substantially flat horizontal surface engaging a side portion of said tip and a peripheral portion of said head by application of a force of a first given magnitude to the uppermost portion of said head in a direction normal to said surface, to a substrate such as a duct surface with said shank perpendicular to said duct surface, which comprises the steps of disposing said pin on a readily compressible insulator layer which parallels said duct surface in such manner that the included angle between said shank and said duct surface is less than 90° and more than 45°, advancing a welding electrode having a planar under surface parallel with said work surface toward said work surface in a direction perpendicular thereto causing said under surface of said electrode to contact the uppermost part of said head portion, progressively advancing said electrode toward said surface to induce a righting tilting movement in said shank as a result of compression and imbedment of said pin in said layer, further advancing said electrode toward said surface to cause said tip to contact said surface and thereby to cause said head to assume the plane of said under surface of said electrode, and thereafter inducing a flow of welding current through said electrode, head and shank responsive to sensing of a force of said electrode against said pin of a second magnitude greater than said first magnitude.

5. The method of claim 4 wherein the length of said shank is less than the radius of said head.